April 25, 1961 R. R. WEBSTER ET AL 2,981,835

AUTOMATIC GAIN CONTROL SYSTEM

Filed Oct. 21, 1955

INVENTORS
ROGER R. WEBSTER AND
JAMES L. NYGAARD

BY Stevens, Davis, Miller & Mosher
ATTORNEYS

United States Patent Office 2,981,835

Patented Apr. 25, 1961

2,981,835

AUTOMATIC GAIN CONTROL SYSTEM

Roger R. Webster and James L. Nygaard, Dallas, Tex., assignors to Texas Instruments Incorporated, Dallas, Tex., a corporation of Delaware Filed Oct. 21, 1955, Ser. No. 541,953

6 Claims. (Cl. 250—20)

Figure 1:
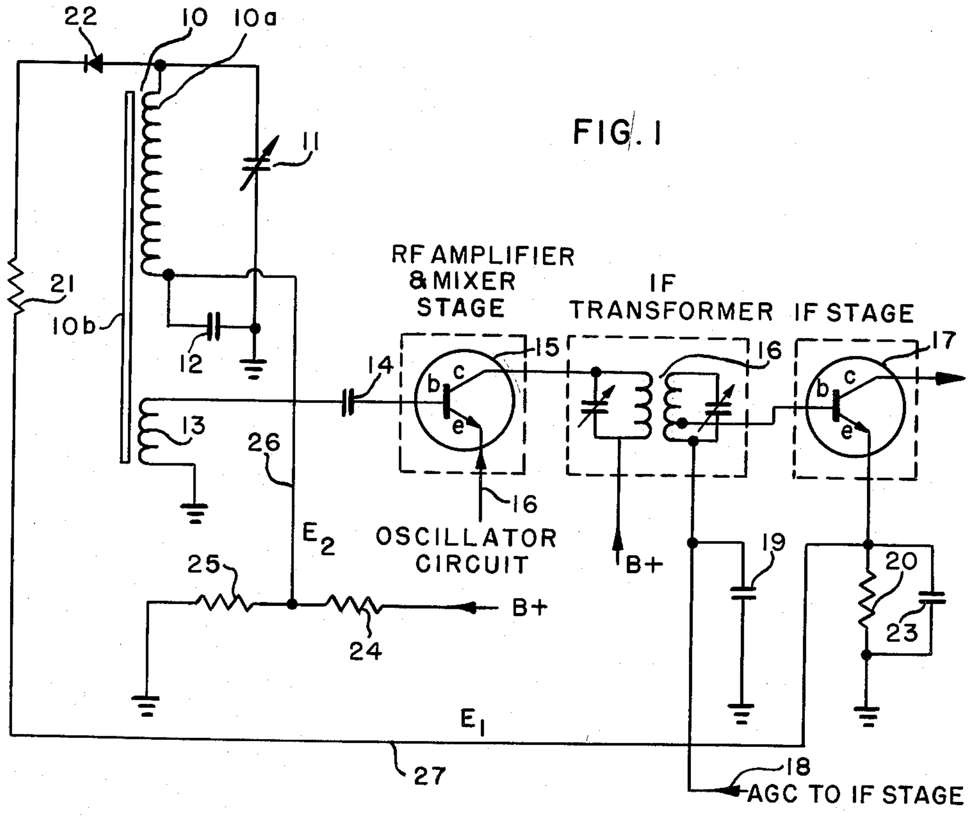

The invention relates to circuits for automatically controlling the gain of signal-receiving systems. More specifically, this invention relates to a voltage sensitive non-linear resistance device and its biasing circuit in combination with the normal automatic gain control of a radio receiver for maintaining a substantially constant output signal level with input signal amplitudes to the receiver antenna beyond the range of the normal gain control circuit.

In the transmission of signals, for example radio frequency signals, the amplitude diminishes rapidly after leaving the transmitting antenna so that the strength of the signals received by the antenna of a radio receiver is a function of the distance of the receiving antenna from the transmitting antenna. Thus, where a radio receiver is tuned from a distant transmitting station to a nearby transmitting station or where the receiver is moving toward a transmitting station such as in an automobile, the signals at the receiver antenna may either change from low to high amplitude or gradually increase in amplitude. Depending upon the power of the transmitting antenna and the proximity of the receiving antenna, it is possible to receive signals of such amplitude that the first amplification stage or stages of the receiver will be overloaded to the point where no recognizable output can be obtained. This signal strength factor has been solved more or less satisfactorily in vacuum-tube radios by the use of variable gain remote cutoff vacuum-tubes which are capable of handling large signals without overload at reduced gain. The problem is present to a much greater extent in transistor radios for the reason that present transistors are essentially sharp cutoff devices and, in common with sharp cutoff vacuum-tubes, cannot handle large signals at reduced gain because of the extreme curvature of the transfer characteristics when operating near cutoff (low gain).

Various automatic gain control circuits, well-known in the prior art, have been associated with the receiver antenna and tuning circuit to reduce the signal level input to the first or radio frequency amplifier stage of the receiver. These automatic gain control circuits, referred to hereinafter as AGC circuits, fall within either one or the other of two general types of circuits. In the first type, a variable resistance device whose resistance decreases with increasing signal level is connected in shunt with the tuning circuit to the first amplification stage of the receiver. The second type of circuit uses a variable resistance device whose resistance increases with increasing signal level and has this device connected in series between the receiving antenna and the tuning circuit for the receiver.

For several reasons, neither type of prior art circuit has been entirely satisfactory. The first type of AGC circuit has used such variable resistance devices as photoelectric cells and glow tubes, neon tubes, and thermistors. These variable resistance devices are subject to one or more of the objections that a considerable amount of control power is required to control the resistance, lack of ability to follow closely changes in signal level and discontinuous rather than smooth, continuous control. In the second type of AGC circuit, the variable resistance in series between the antenna and the tuning circuit for the receiver cannot be used with a loop-type antenna circuit. Perhaps most important of all, in both types of circuits, the range of signal level control available is limited by the resistance range of the variable resistance device; consequently, when the resistance range of the device has been exceeded, the AGC circuit no longer functions to control the signal level.

The present invention falls generally within the type of AGC circuit in which the variable resistance device is connected in shunt across a parallel tuned input circuit to the first amplification stage of the receiver. However, in place of the prior art variable resistance devices, this invention uses as a non-linear resistance a voltage-sensitive diode which requires nominal amounts of control power and has the ability to follow closely and smoothly changes in signal level. Since the invention is most applicable to transistor receivers, the diodes in such receivers are p-n junction semiconductor diodes in which the semiconductor material may be either germanium or silicon. A voltage divider circuit applies a fixed reference voltage to the diode in such a direction and polarity as to bias it in the condition for conduction. A second voltage, derived from the normal AGC circuit of the radio receiver, is also applied to the diode but in such a direction and polarity as to bias the diode for non-conduction. The voltage derived from the AGC circuit is greater than the fixed reference voltage until a predetermined level is reached and, consequently, the diode has very little or no effect below this level and signal control in the radio receiver is by means of the normal AGC circuit. However, as the incoming signals increase above the predetermined level, the AGC voltage to the diode decreases below the fixed reference voltage and the diode, then being in a conductive condition, takes over the signal level control of the receiver. By affecting the impedance loading on the inductance coil of the parallel tuned circuit, the diode bypasses to ground a portion of the signals in proportion to their amplitude and thus reduces the amplitude of the signals received in the amplification stage or stages of the receiver.

Accordingly, it is a principal object of this invention to provide a voltage sensitive, non-linear resistance device for extending the signal control range of the normal AGC circuit of a receiving system whereby the normal AGC circuitry controls the signal level in the receiver until a predetermined level is reached and thereafter signal level control is accomplished by means of the non-linear resistance device.

It is another object of this invention to provide an AGC system for signal receiving systems of the transistor type although applicable as well to receiving systems of the vacuum-tube type.

It is another object of this invention to provide a signal receiver with a circuit that, for signals above a predetermined level, shall control the gain of an amplifier in the receiver by varying the load impedance of the tuned input circuit to the receiver.

It is still another object of this invention to provide a voltage sensitive diode with non-linear resistance characteristics for reducing the amplitude level of input signals to the first stage amplifier of a signal receiving system.

It is a further object of this invention to connect a diode in shunt across a parallel tuned circuit, which parallel tuned circuit serves as a loop-type antenna as well as the input to the first amplifier stage of a radio receiver, thereby bypassing signals above a predetermined level without narrowing the bandwidth selectivity of the parallel tuned circuit.

It is a still further object of this invention to provide a voltage sensitive, non-linear resistance diode requiring minute amounts of control power and having the ability to follow smoothly and rapidly changes in signal control level.

Figure 2:
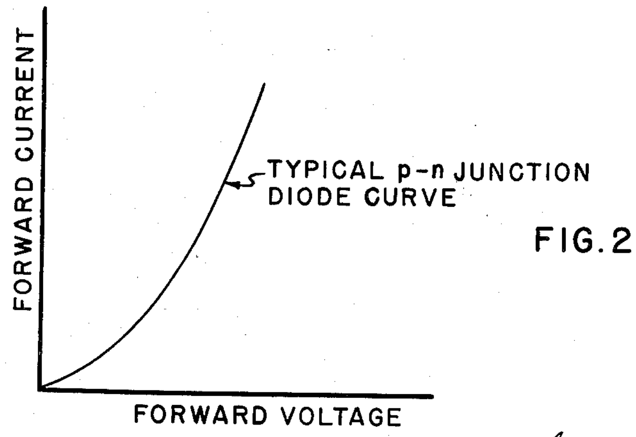

The above objects will be clarified and other objects made known from the following discussion when taken in conjunction with the drawings in which:

Figure 1 is a partial schematic diagram of a radio receiver illustrating principally the automatic gain control circuit of this invention; and Figure 2 is a forward current curve of a typical p-n junction semiconductor diode plotted against voltage showing thereby its non-linear resistance characteristics.

Referring now to Figure 1, only that portion of a signal receiving system, represented as a radio receiver, necessary to describe the present invention is shown. Transistors are used in the radio receiver circuit of Figure 1 and the voltages applied to the transistors will be discussed hereinafter in terms of the voltage polarities appropriate for n-p-n transistors. However, it should be recognized that p-n-p transistors could be used in place of the n-p-n transistors by reversing the D.C. polarities of the voltages as discussed or, alternatively, the amplifying elements of the radio receiver could be vacuum-tubes in place of transistors. In like manner, the non-linear resistance diode element will be discussed in terminology appropriate for a p-n junction semiconductor diode although a vacuum-tube diode could be suitably substituted in its place.

Radio frequency signals are received by an antenna 10, the antenna being shown as comprised of an antenna coil **10*a* and a ferrite core 10*b*. In parallel with antenna 10 is a variable capacitor 11 and a fixed capacitor 12 forming thereby a parallel tuned circuit in which the variable capacitor 11 tunes the circuit to resonance at the desired signal frequency. It should be recognized at this point that this invention is not limited to the ferrite core antenna as shown since the radio frequency signals can be received by any conventional antenna and fed, for example, to a parallel tuned circuit comprised of coil 10*a* and variable capacitor 11**.

A second coil 13 is wound on the ferrite core **10*b* and voltages corresponding to the radio frequency signals received at the antenna are induced in coil 13 and fed through a blocking capacitor 14 into the base of transistor 15. Coil 13 has a smaller number of coil turns than coil 10*a* in order to provide an impedance match between the high impedance of the parallel tuned circuit at resonance and the low input impedance of the base of transistor 15. Transistor 15, as shown, serves as the radio frequency amplifier and mixer stage and receives at its emitter the output of an oscillator circuit through lead 16. As is well-known in super-heterodyne receivers, the oscillator frequency is mixed with the input signal frequency to produce an intermediate frequency, usually of 455 kilocycles although 262 kilocycles is another common intermediate frequency. In the biasing circuit for transistor 15, a positive voltage is shown as being applied through the primary coil of the intermediate frequency transformer 16** to its collector.

The intermediate frequency signals from transistor 15 are coupled into the base of transistor 17, the first intermediate frequency amplifier stage of the receiver, through the double tuned intermediate frequency transformer 16. Transistor 17, like transistor 15, has a low input impedance and thus, the input lead to the base is tapped down on the secondary coil of transformer 16 to provide an impedance match with the output of transistor 15. In order to bias the n-p-n transistor 17 for amplification, the emitter-base diode is biased in the forward direction and the collector-base diode is biased in the reverse direction. Therefore, to obtain the proper bias conditions, the D.C. emitter voltage of transistor 17 is negative with respect to the base and the D.C. collector voltage is positive with respect to the base. The amplifier intermediate frequency signals are fed from transistor 17 through one or more succeeding stages of intermediate frequency amplification and from there to a detector. In the detector, the audio-frequency signals are first detected and then coupled into a conventional audio-frequency amplifier and sound reproducer. In addition, the detector produces a negative D.C. voltage proportional to the signal level received, which voltage is fed back as a negative AGC voltage to the base of transistor 17 through line 18 and the series-connected secondary of transformer 16. Bypass condenser 19 is connected into line 18 to provide a low impedance path to ground for A.C. signals, both audio frequency from the detected signal and radio frequency from transformer 16.

To form the second AGC circuit, according to the present invention, a p-n junction semiconductor diode 22 is connected in shunt across the antenna 10 and thus across the parallel tuned circuit comprised of coil **10*a* and capacitor 11. A fixed reference voltage $E_2$ is obtained by feeding the B+ battery voltage through a voltage divider network consisting of resistors 24 and 25. A line 26 is tapped in between resistors 24 and 25 and feeds the reference voltage $E_2$ developed across resistor 24 through coil 10*a* to the diode 22. A second voltage $E_1$ to diode 22 is developed across resistor 20 connected in series with the emitter of transistor 17 to ground. The voltage $E_1$, produced by the emitter current through resistor 20 is fed through lead 27 and the series-connected resistor 21 to the other side of diode 22** from the $E_2$ voltage connection.

Although a circuit arrangement has been described for providing the bias voltages $E_1$ and $E_2$ to diode 22, it is possible to provide these voltages in other ways. For example, $E_2$ can be derived from some other point of fixed voltage in the circuit and thus the voltage divider network of resistors 24 and 25 eliminated. Similarly, the variable bias voltage $E_1$ need not necessarily come from the emitter of transistor 17 since the voltage $E_1$ could either be obtained from the automatic gain control signal to transistor 17 or developed across a suitable resistor in the collector D.C. return provided, of course, suitable adjustments were made in the fixed reference voltage $E_2$. This latter connection has the added advantage that considerable amplification of the normal AGC control voltage may be obtained in transistor 17, and thus a greater control of diode 22 is possible.

In operation, the circuit provides improved AGC control in the following described manner. With low level signal inputs to the antenna, there is little AGC voltage developed and the emitter of transistor 17 remains considerably negative with respect to the base. In this condition, the emitter current is normally 0.5 to 1.0 milliamps and, since resistor 20 may have a typical value of from 470 ohms to 2200 ohms, the voltage $E_1$ developed is equal to the emitter current times the resistance of resistor 20. The voltage $E_2$ is set by the voltage divider network of resistors 24 and 25 to be somewhat less than $E_1$, the exact value not being critical. However, it is desired for the p-n junction diode 22 to have no effect on the input signals until a predetermined signal level has been reached and so the diode connection is such that the n-type side of the junction is connected with the voltage $E_1$ and the p-type side of the junction is connected with $E_2$. Since $E_1$ is then positive with respect to $E_2$, the p-n junction diode will be biased in the reverse direction for current flow and thus has substantially no effect on the antenna coil.

Then, as the signal level in the receiver increases, the larger amount of negative AGC voltage to the base of transistor 17 reducts the bias between the base and the emitter and the emitter current drops. As the emitter current drops, voltage $E_1$ drops and the bias existing across 22 is reduced. At a predetermined amplitude of input signal level, the voltage $E_1$ drops to a point below the fixed voltage $E_2$ and diode 22 will then be biased in the forward direction. Depending upon the strength of the signal and the amount of voltage $E_2$, diode 22 will be set to operate around some point along the current-voltage curve shown in Figure 2. As can be seen from the curve of Figure 2, the current is not a linear function of the voltage and, therefore, when diode 22 is biased only slightly in the forward direction, the diode will operate in the higher resistance portion of the curve. However, as the signal level increases and the operating point of diode 22 is shifted to a higher point on the curve, its resistance will be lower thus permitting a greater amount of current to flow.

When diode 22 is biased in the forward direction for conduction, the diode in effect represents a low impedance shunt across the parallel tuned circuit. The effect of this low shunt impedance is to load the coil 10*a* in an amount inversely proportional to the impedance of the diode. Depending upon the diode loading on coil 10*a*, a proportionate part of the signal received at the antenna is bypassed to ground through diode 22, resistor 21, line 27 and the bypass capacitor 23 around resistor 20. To illustrate the effectiveness of the circuit of this invention, the typical increase in signal amplitude before the overload point is reached is 26 db over the same receiver without this circuit. By choosing the value of resistor 21 and tapping diode 22 down on the antenna coil 10*a*, various increases in overload characteristics may be obtained with great smoothness in operation.

The circuit of this invention also helps to overcome the sharpening of tuning which occurs with transistor receivers in the presence of strong signals as automatic gain control is applied. Sharpening of the bandpass frequency occurs since the input impedance of the intermediate frequency transistor amplifier is raised as current and gain is reduced by the action of the automatic gain control. This, in turn, has a tendency to narrow the bandpass characteristics of the intermediate frequency transformer, because of the reduced loading on the transformer. The diode 22, however, as a shunt resistance, increases the loading on the antenna coil and broadens the bandpass characteristic of the tuned input circuit. Thus, these two opposing factors act to cancel each other and the bandpass tends to remain constant.

As has been indicated throughout the description of the preferred embodiment of this invention, various changes, modifications and substitutions may be made without departing from the invention disclosed. Accordingly, all such changes, modifications and substitutions as fall within the scope of the appended claims are intended as part of this invention.

What is claimed is:

1. An automatic gain control for signal receiving systems comprising a first automatic gain control circuit operative to control said system for signal levels up to a predetermined level, a voltage sensitive non-linear resistance device connected in shunt across a parallel tuned signal input circuit to said receiving system, a fixed voltage applied to said device, a variable voltage dependent upon the voltage of said first automatic gain control circuit applied to said device, said voltages biasing said device to be non-conductive below the said predetermined signal level and conductive above said predetermined signal level whereby an extended range is provided over which the output signal level of said system remains substantially constant.

2. An automatic gain control for signal receiving systems comprising a first automatic gain control circuit operative to control said system for signal levels up to a predetermined level, a diode connected in shunt across a parallel tuned signal input circuit to said receiving system, a fixed voltage applied to said diode, a variable voltage dependent upon the voltage of said first automatic gain control circuit applied to said diode, said voltages biasing said diode to be non-conductive below the said predetermined signal level and conductive above said predetermined signal level whereby an extended range is provided over which the output signal level of said system remains substantially constant.

3. An automatic gain control circuit for signal receiving systems as defined in claim 2 wherein said receiving system is a transistor receiver and said diode is a p-n junction semiconductor diode.

4. An automatic gain control for signal receiving systems as defined in claim 2 wherein said fixed voltage is provided by a voltage divider network.

5. In a signal receiver having a tuned input circuit and an amplifier stage, a first automatic gain control circuit operative to produce a first variable automatic gain control signal having a predetermined relationship to the strength of a received signal over a first range of values, means for applying said automatic gain control signal to said amplifier stage to change compensatorily the overall signal gain through said receiver to maintain the output from said receiver substantially constant when said received signal varies over said first range of values, means including said amplifier responsive to said first automatic gain control signal for deriving another signal having another predetermined relationship to the strength of said received signal, and non-linear impedance means connected across said tuned circuit unresponsive to variations in said another signal when said received signal varies over said first range of values for maintaining a substantially constant high impedance shunt across said tuned input circuit, said non-linear impedance means being responsive to variations in said another signal when said received signal varies over other than said first range of values for compensatorily shunting said tuned circuit to maintain the level of the signal at the output of said receiver substantially constant.

6. An automatic gain control for a signal receiving system employing at least one plural electrode semiconductor device connected to amplify a signal comprising the combination of first automatic gain control means connected to continuously apply to at least one electrode of said plural electrode semiconductor device a unidirectional potential which varies in accordance with the magnitude of input signals for said signal receiving system, and second automatic gain control means comprising a voltage sensitive ararngement having a two-electrode non-linear resistance connected in shunt across the input signal path of said signal receiving system, one electrode of said non-linear resistance receiving from a different electrode of said plural electrode semiconductor device a unidirectional bias potential which renders said non-linear resistance conductive only for input signal magnitudes above a given value.

References Cited in the file of this patent

UNITED STATES PATENTS

| | | |
|---|---|---|
| 2,012,433 | Myers | Aug. 27, 1935 |
| 2,159,803 | Klotz | May 23, 1939 |
| 2,395,770 | Vilkomerson | Feb. 26, 1946 |
| 2,570,893 | Wilkes | Oct. 9, 1951 |
| 2,581,202 | Post | Jan. 1, 1952 |
| 2,605,399 | Pound | July 29, 1952 |
| 2,641,704 | Stott | June 9, 1953 |
| 2,774,866 | Burger | Dec. 18, 1956 |
| 2,789,164 | Stanley | Apr. 16, 1957 |
| 2,858,423 | Stern | Oct. 28, 1958 |

FOREIGN PATENTS

| | | |
|---|---|---|
| 413,383 | Great Britain | July 19, 1934 |
| 414,187 | Great Britain | Aug. 2, 1934 |

OTHER REFERENCES

Article: "Transistor Circuitry in Japan," Electronics, July 1956, pages 120 to 124.